US011293606B2

(12) United States Patent
Kager

(10) Patent No.: US 11,293,606 B2
(45) Date of Patent: Apr. 5, 2022

(54) LIGHT-EMITTING DIODE STRIP, METHOD FOR PRODUCING A LIGHT-EMITTING DIODE TAPE, AND LIGHT-EMITTING DIODE TAPE

(71) Applicant: Gerhard Kager, Gallneukirchen (AT)

(72) Inventor: Gerhard Kager, Gallneukirchen (AT)

(*) Notice: Subject to any disclaimer, the term of this patent is extended or adjusted under 35 U.S.C. 154(b) by 0 days.

(21) Appl. No.: 16/341,169

(22) PCT Filed: Oct. 12, 2017

(86) PCT No.: PCT/EP2017/076084
§ 371 (c)(1),
(2) Date: Apr. 11, 2019

(87) PCT Pub. No.: WO2018/069453
PCT Pub. Date: Apr. 19, 2018

(65) Prior Publication Data
US 2020/0182417 A1 Jun. 11, 2020

(30) Foreign Application Priority Data

Oct. 12, 2016 (DE) .................... 10 2016 119 452.2
Dec. 5, 2016 (DE) .................... 10 2016 123 471.0
(Continued)

(51) Int. Cl.
*F21S 4/24* (2016.01)
*F21V 31/04* (2006.01)
(Continued)

(52) U.S. Cl.
CPC .............. *F21S 4/24* (2016.01); *B60Q 1/2696* (2013.01); *F21S 4/22* (2016.01); *F21V 31/04* (2013.01);
(Continued)

(58) Field of Classification Search
CPC .... F21S 4/24; F21S 4/22; F21V 31/04; B60Q 1/2696
See application file for complete search history.

(56) References Cited

U.S. PATENT DOCUMENTS

2003/0137839 A1* 7/2003 Lin ........................... F21S 4/24
362/800
2011/0164419 A1* 7/2011 Klus ....................... F21V 15/015
174/79
(Continued)

FOREIGN PATENT DOCUMENTS

DE 102014221721 A1 4/2016
DE 102014221721 B4 9/2017
WO 2014036629 A1 3/2014

OTHER PUBLICATIONS

WIPO, International Prelminary Report on Patentability, PCT/EP2017/076084, dated Apr. 18, 2019.

*Primary Examiner* — Rajarshi Chakraborty
*Assistant Examiner* — Nathaniel J Lee
(74) *Attorney, Agent, or Firm* — Rod D. Baker

(57) ABSTRACT

The invention relates to a method for producing an LED tape, comprising the following steps: producing an elastic base profile (1) and rolling up the elastic base profile (1) onto a first roll (11); producing an LED strip (323) comprising a flexible conductor tape (flexible PCB) (32) populated with LED chips (3) and rolling up the LED strip (323) onto a second roll (33); unrolling the base profile (1) from the first roll (11); unrolling the LED strip (323) from the second roll (33) and inserting the LED strip (323) into the base profile (1) and covering the LED strip (323) in the base profile (1) with a potting compound (2) and/or with a covering profile (7). The invention also relates to an LED tape in which a rollable LED strip (323) which has a flexible conductor tape (flexible PCB) (32) populated with LED chips (3) is fixed in
(Continued)

a rollable elastic base profile (1) and is covered with a potting compound (2) and/or an in particular rollable, covering profile (7). The invention also relates to an LED strip (323) in which the flexible conductor tape (32) is corrugated in its longitudinal direction (L).

26 Claims, 11 Drawing Sheets

(30) Foreign Application Priority Data

| | | |
|---|---|---|
| Jan. 9, 2017 | (DE) | 10 2017 000 125.1 |
| Mar. 23, 2017 | (DE) | 10 2017 106 291.2 |
| May 19, 2017 | (DE) | 10 2017 110 987.0 |

(51) Int. Cl.
    *F21S 4/22*     (2016.01)
    *B60Q 1/26*     (2006.01)
    *F21Y 103/10*     (2016.01)
    *F21Y 115/10*     (2016.01)

(52) U.S. Cl.
    CPC ........ *F21Y 2103/10* (2016.08); *F21Y 2115/10* (2016.08)

(56) References Cited

U.S. PATENT DOCUMENTS

| | | | |
|---|---|---|---|
| 2011/0291125 A1* | 12/2011 | Donauer | F21S 4/24 257/E33.012 |
| 2013/0293097 A1* | 11/2013 | Bergenek | H05B 33/02 313/512 |
| 2014/0036500 A1* | 2/2014 | Eggleton | F21V 29/87 362/249.02 |
| 2014/0160363 A1* | 6/2014 | Mutschelknaus | G09F 9/3026 348/799 |
| 2015/0016122 A1* | 1/2015 | Roberts | H05K 1/189 362/373 |
| 2015/0330584 A1* | 11/2015 | Bobbo | F21S 2/005 29/592.1 |
| 2017/0016582 A1* | 1/2017 | Yang | F21K 9/232 |
| 2017/0059140 A1* | 3/2017 | Dubuc | H05K 1/189 |

* cited by examiner

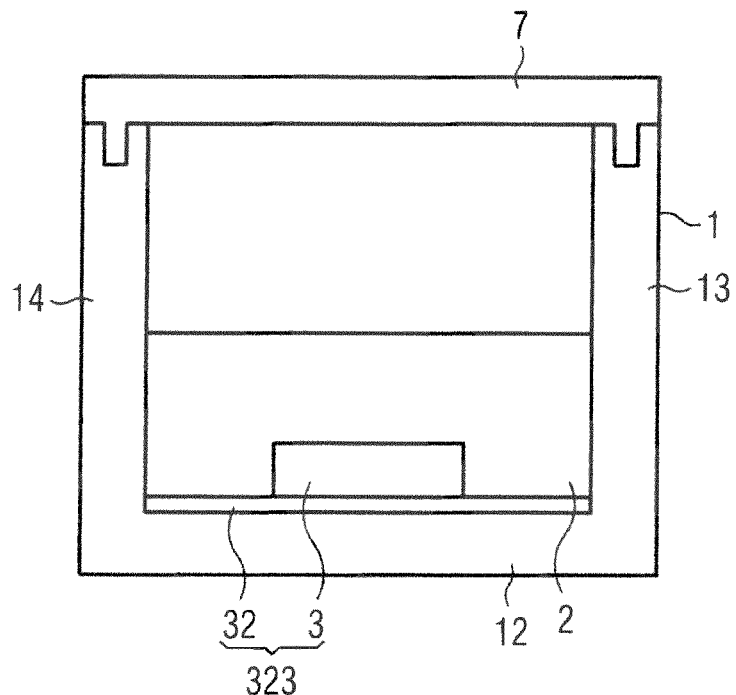
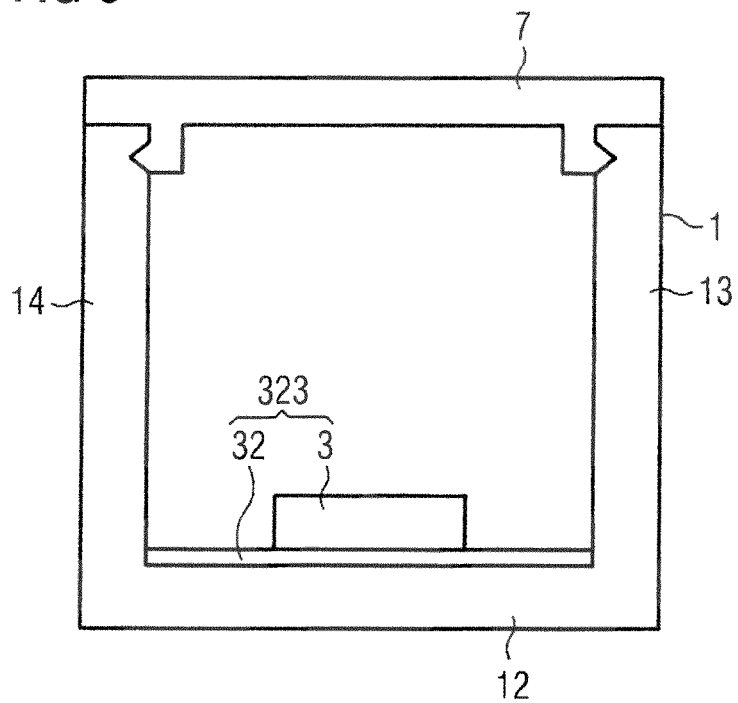

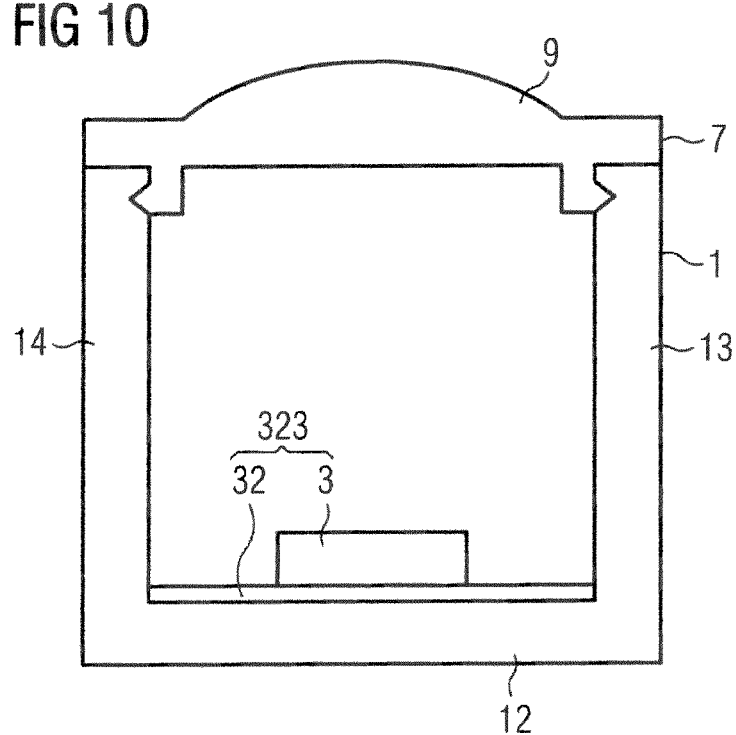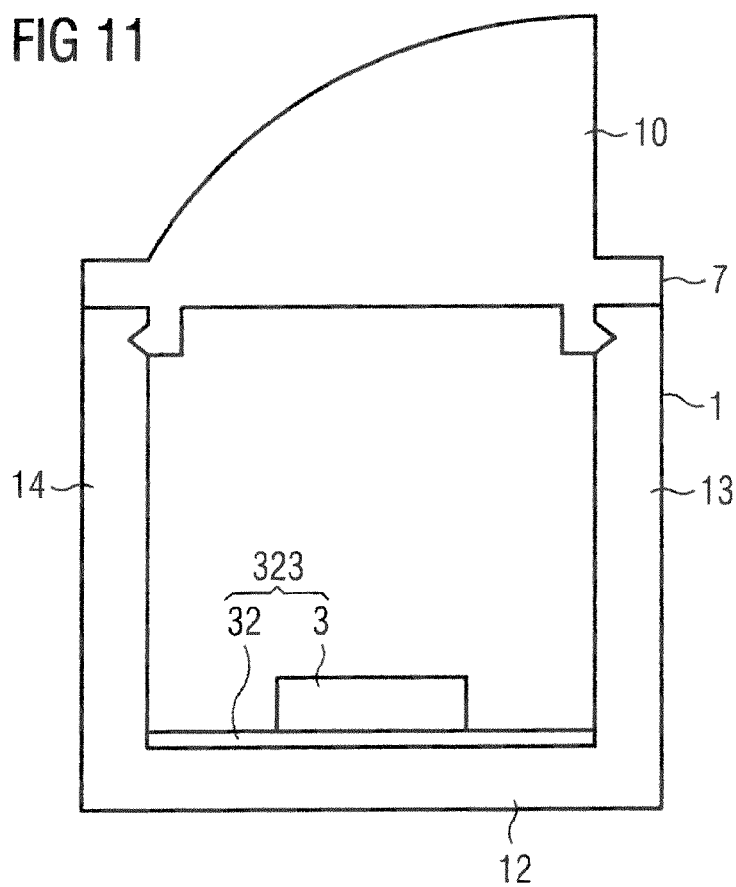

FIG 13
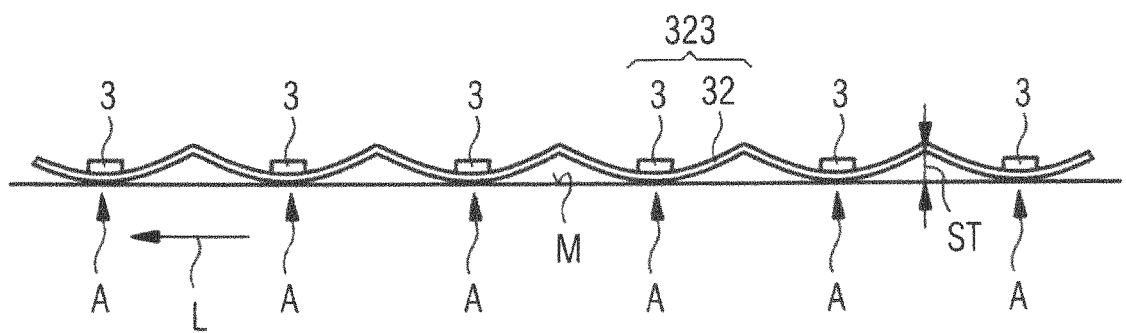
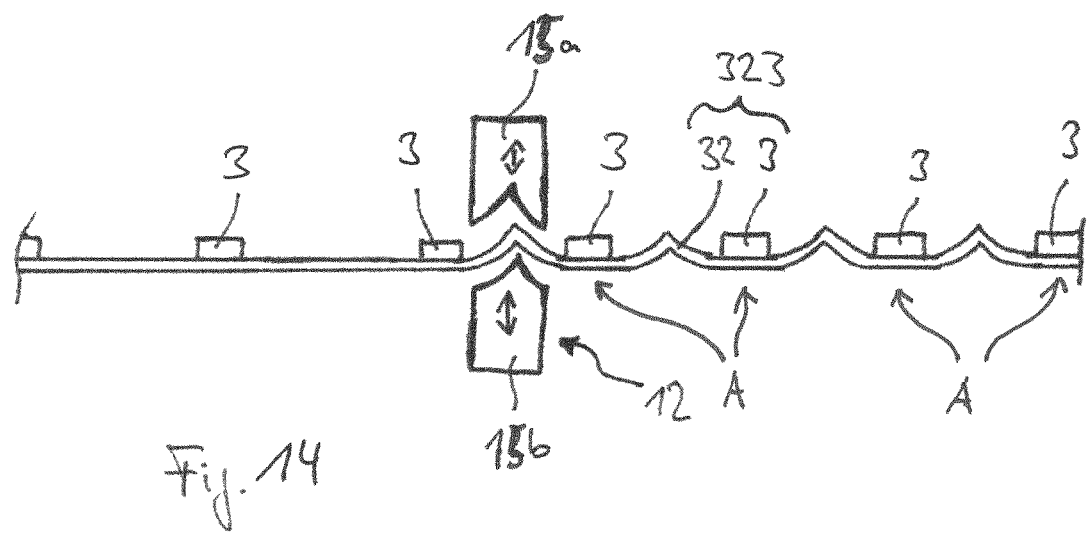
Fig. 14

LIGHT-EMITTING DIODE STRIP, METHOD FOR PRODUCING A LIGHT-EMITTING DIODE TAPE, AND LIGHT-EMITTING DIODE TAPE

Light-emitting diode tapes (hereinafter LED tapes), in particular LED tapes in which LED chips are mounted on flexible printed circuit boards (also referred to as flexible PCBs) by means of chip-on-board (COB) technology, have to have an encapsulation that seals the LED chips inclusive of printed circuit board and thus protects them against mechanical damage, dust, water and other ambient influences. An encapsulation of this kind is produced generally by means of polyurethane (PU) or silicone potting. LED chips presently include both light-emitting semiconductor bodies provided with a housing, for example with a lead frame-based plastic encasement (for example PLCC2 SMD LEDs, PLCC4 SMD LEDs, or PLCC6 SMD LEDs), which are mounted on the flexible printed circuit board, and also unhoused light-emitting semiconductor bodies which are mounted on the flexible printed circuit board. Here, the light-emitting semiconductor bodies can be based on inorganic or organic electroluminescent materials.

A disadvantage of the conventional potting methods is that the available potting facilities have a low degree of automation and consequently a low level of productivity, as well as limitations in respect of the length of the produced LED tapes. The manufacture of "endless" LED tapes is not possible with the encapsulation technology available to date.

The advantages of endlessly manufactured LED tapes of the above-mentioned kind would provide the following significant advantages:
 cutting on-site by the customer; customer-specific length adaptation;
 possibility to provide long lengths, as are necessary for example for vehicles and means in the transport sector and in architecture;
 cost reduction due to a higher degree of automation.

Cost-effective base profiles can be produced by means of metal or plastic profile extrusion or co-extrusion, particularly preferably in an endless process on a reel and/or in much longer lengths than previously possible, in any shape and colour. Where reference is made hereinafter to extrusion, this term shall also include, consistently, metal or plastic co-extrusion in addition to mono-extrusion.

The invention relates to
a) a method for producing a light-emitting diode tape or an endless light-emitting diode tape having the following method steps:
 producing a resilient base profile and rolling up the resilient base profile on a first reel;
 producing an LED strip which comprises a flexible conductor tape (flexible PCB) populated with light-emitting diode (LED) chips and rolling up the LED strip on a second reel;
 unrolling the base profile from the first reel; unrolling the LED strip from the second reel, and inserting the LED strip into the base profile; and
 covering the LED strip in the base profile by means of a potting compound and/or by means of a cover profile.
b) In an embodiment of the method according to a) the resilient base profile is produced by means of profile extrusion.
c) In an embodiment of the method according to a) or b) the resilient base profile is produced substantially from thermoplastic elastomer (TPE) material (for example thermoplastic elastomer based on urethane (TPU)).
d) In an embodiment of the method according to a) or b) the resilient base profile is produced substantially from PVC material, in particular soft PVC material, or substantially from another resilient thermoplastic material or substantially from a resilient thermoset material.
e) In an embodiment of a method according to any one of points a) to d) the surface condition of the material of the base profile, in particular the surface tension thereof, is modified by means of a corona, a plasma, a chemical and/or a mechanical process in order to improve the adhesion of the potting compound on the base profile.
f) In an embodiment of a method according to any one of points a) to e) at least one PU material for example is advantageously comprised at least in part.
g) In an embodiment of a method according to any one of points a) to f) the LED strip is advantageously sealed prior to being inserted into the base profile.

In an embodiment of a method according to any one of points a) to g) the LED strip is fixed in the base profile by means of a connection layer, in particular by means of a double-sided adhesive tape or by means of an adhesive layer.
h) In an embodiment of a method according to any one of points a) to g) the base profile provided with the LED strip and the potting compound and/or the cover profile is treated in a hardening and/or drying furnace, and the finished light-emitting diode tape is cut subsequently into predefined lengths or is rolled up on a third reel.

The invention also relates to
i) a light-emitting diode tape in which a rollable LED strip which comprises a flexible conductor tape (flexible PCB) populated with light-emitting diode (LED) chips is fixed in a resilient rollable base profile and is covered by a potting compound and/or a cover profile, in particular a rollable cover profile.
j) In an embodiment of the light-emitting diode tape according to point i) the resilient base profile is produced by means of profile extrusion.
k) In an embodiment according to point i) or j) the resilient base profile comprises thermoplastic elastomer (TPE) material (for example thermoplastic elastomer based on urethane (TPU)).
l) In another embodiment according to point i) or j) the resilient base profile comprises PVC material, in particular soft PVC material, or another resilient thermoplastic material or a resilient thermoset material.
m) In an embodiment according to any one of points i) to l) the potting compound is produced from at least one PU material.
m) In an embodiment according to any one of points i) to m) the LED strip (323) is sealed separately.
n) In an embodiment according to any one of points i) to n) the light-emitting diode tape is wound up on a reel.

Advantageous embodiments of a light-emitting diode strip (LED strip), in particular for use in LED tapes of this kind, are described in the claims. A further method for producing "endlessly" manufactured LED tapes also is described in the claims. Advantageous developments of the method likewise are described in the claims. An "endlessly" manufactured LED tape is described in the claims. Advantageous developments of the LED tape are also described in the claims. The disclosure of the claims as originally filed is hereby incorporated in the description by express reference.

Endlessly manufactured LED tapes of this kind, in addition to the advantages already mentioned above, also provide the following further significant advantages:
 possibility of integrating fastening systems;
 possibility of integrating lens technology;

colour, shape and geometry freedoms;

possibility of integrating heat management.

The method, the LED tape and the light-emitting diode strip will be explained in greater detail hereinafter on the basis of exemplary embodiments in conjunction with FIGS. 1 to 19, in which:

FIGS. 8 to 11 show schematic depictions of sectional views of four different embodiments of an LED tape with base profile and cover profile;

FIG. 13 shows a schematic depiction of a side view of a corrugated LED strip for use in an LED tape;

Figure 18:
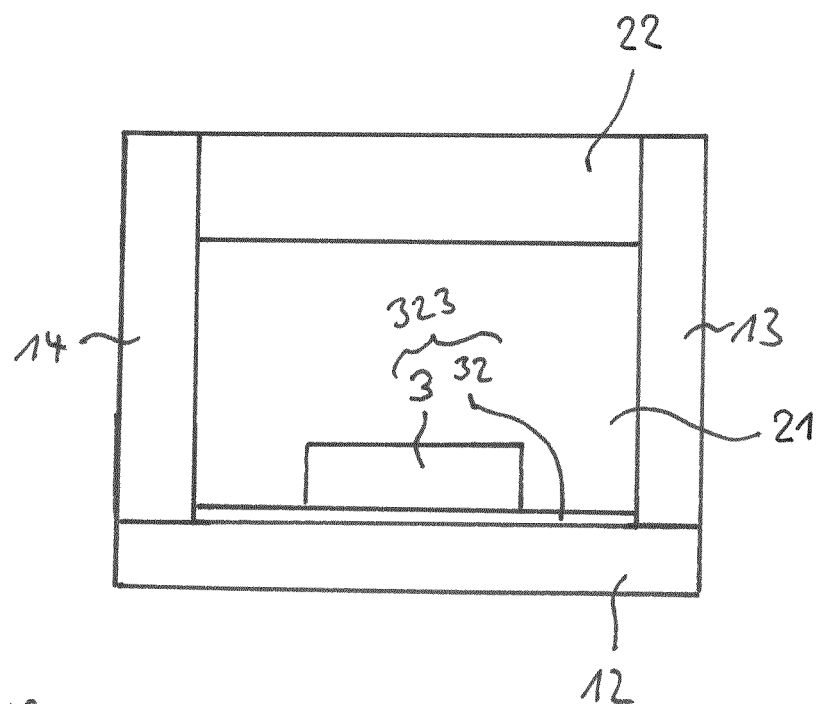
Figure 19:
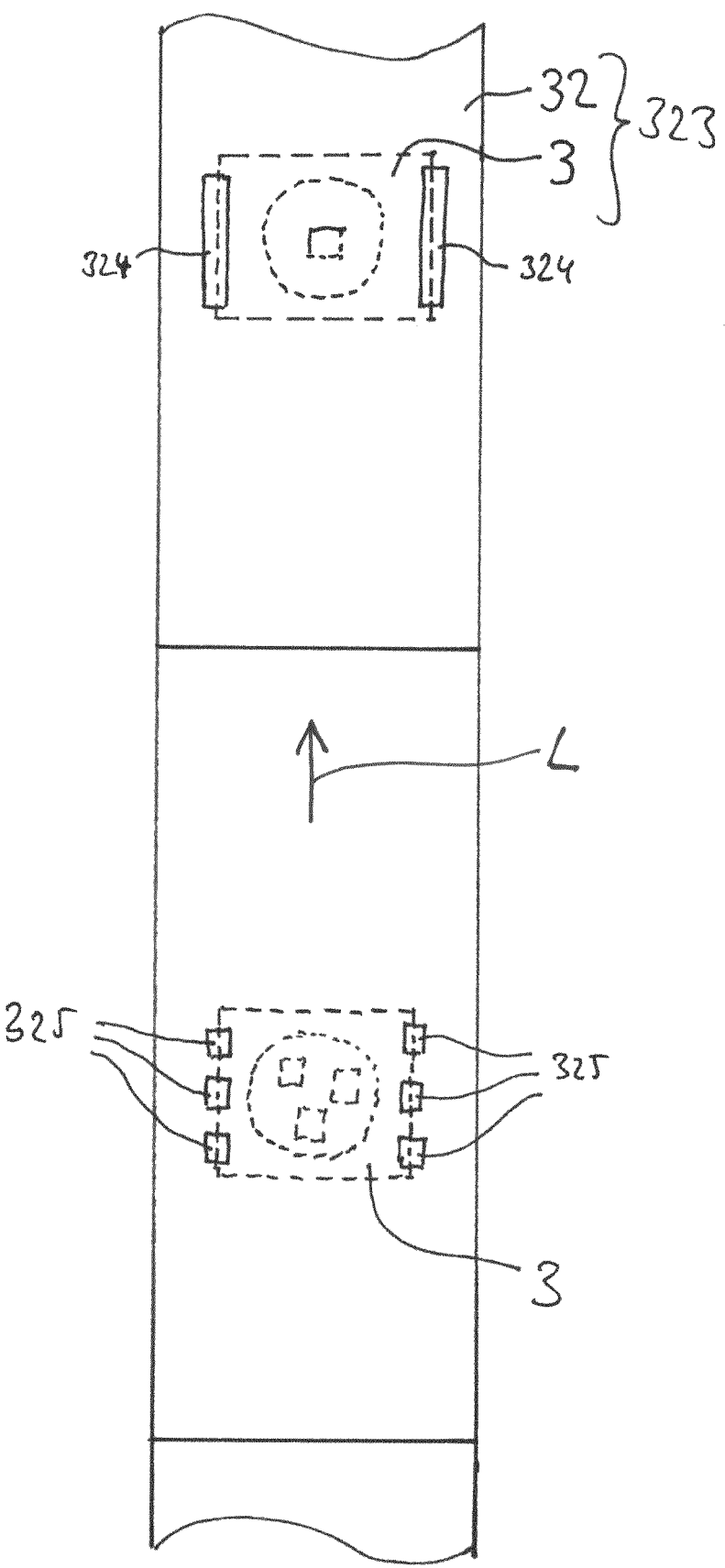

FIGS. 14 to 17 each show a schematic illustration of a method and a device for producing four variants of a corrugated LED strip;

FIG. 18 shows a schematic depiction of a sectional view of a further embodiment of an LED tape with base profile;

FIG. 19 shows a schematic depiction of embodiments of solder connections of an LED strip.

In the different exemplary embodiments, variants and designs, like and functionally like component parts are in each case provided with the same reference signs in all figures. The figures in principle are not shown to scale. The proportions of the various component parts relative to one another do not correspond to the situation in reality. For example, relatively small elements have been shown in an exaggerated size for improved illustration, and vice versa.

In the method presented here, a resilient base profile 1 (see FIG. 1 for example) preferably consisting substantially of thermoplastic elastomer (TPE) material (for example thermoplastic elastomer based on urethane (TPU)) or substantially comprising TPE material, or a further resilient base profile preferably consisting substantially of aliphatic or aromatic polyurethane (PU) or comprising an aliphatic or aromatic polyurethane (PU) is preferably produced by means of profile extrusion. It is also possible that the base profile consists substantially of PVC material, in particular soft PVC material, or comprises a substantially PVC material, in particular soft PVC material. Resilient thermoset materials (such as unsaturated polyester (UP)) and also further thermoplastic materials (for example polymethyl methacrylate (PMMA) material and polycarbonate (PC) material), which for example are kept resilient by means of additives or suitable blends, even in the cured state, such that these materials are pliable, and preferably rollable, are also suitable.

The terms "thermoplastic elastomer material", "thermoset material" and "thermoplastic material" in the present context also include materials that consist substantially of at least one thermoplastic elastomer material, at least one thermoset material and/or at least one thermoplastic material, such as corresponding composite materials, for example.

The resilient base profile 1 is produced preferably with a wall thickness of between 1 mm and 3 mm, preferably between 1 mm and 2 mm (inclusive of the limit values), in particular with use of aliphatic or aromatic polyurethane (PU) for the production of the base profile 1.

This base profile 1 is preferably rolled up; it can be produced in a wide range of different geometries and colours, resulting in an increased design freedom.

Following the extrusion of the base profile 1, the surface condition, for example the surface tension of the base profile material, can be modified for example by means of a corona, a plasma, a chemical and/or a mechanical process. If necessary, an improved adhesion can thus be attained between the base profile material, preferably a TPE or TPU material or another of the above-mentioned materials that can be used advantageously, and a potting compound 2, preferably a PU material, which is used to pot, that is to say seal, the LED chips 3 inclusive of flexible printed circuit board.

Instead of TPE, the use of other plastics suitable for the described purpose (for example thermoplastic polyurethane (TPU, preferably an aliphatic or aromatic polyurethane (PU)) and PVC), of suitable textiles and/or of suitable metals (for example aluminium and copper) is conceivable primarily for the extrusion of the base profile 1.

In the method presented here, the base profile 1 is firstly produced preferably on a reel, in an arbitrary length by means of extrusion. This is possible with different cross-sectional geometries and with different colours.

Advantageous developments of the method will be explained in greater detail hereinafter, wherein the order and numbering of the developments is not intended to be reflective of any kind of ranking of importance.

Figure 1:
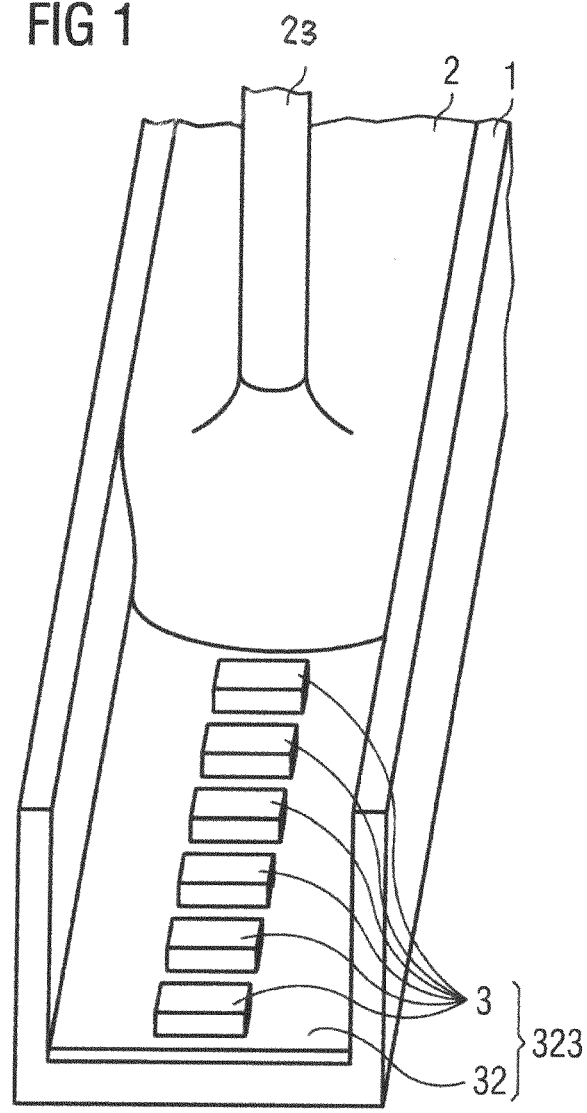
FIG. 1 shows a schematic depiction of a perspective view of an LED tape produced by the method described herein.

In the method shown in FIG. 1 a potting compound 2, which for example consists of an above-mentioned material, preferably of PU, is filled into the base profile 1 via a nozzle 23 arranged above the base profile 1. An LED strip 323 is laid in the base profile 1 and comprises a plurality of LED chips 3 arranged on a flexible conductor tape (flexible PCB) 32. The base profile 1 is for example made of TPE material or TPU material, preferably an aliphatic or aromatic polyurethane (PU). The LED strip 323 can be fixed in the base profile 1 for example by means of a double-sided adhesive strip or by means of another kind of connection layer.

First Advantageous Development (See FIG. 2):

In a first advantageous development of the method, the base profile 1 is introduced into a potting facility 20 from a reel 11, which in particular is provided for storage and transport. The flexible conductor tape 32 (flexible PCB) populated with LED chips 3, that is to say the LED strip 323, is introduced via suitable guide means (not shown) into the base profile 1—more specifically locally before the potting facility 20—optionally likewise from a reel 33 provided in particular for storage and transport, and is fixed in the base profile 1 for example by means of a double-sided adhesive tape (not shown in the figures) or another kind of connection layer, in particular adhesive layer.

These two components (base profile 1 and conductor tape 32 with LED chips 3) pass through the potting facility 20, and the base profile 1 is filled with a potting compound 2, preferably with a PU material. For example, silicone material is also conceivable as potting compound 2. The base profile 1 potted in this way, with the LED chips 3 on a flexible printed circuit board 32 arranged therein, passes from the potting facility 20 directly into a hardening and/or drying furnace 4 in order to harden the potting compound 2, and is then wound up in the form of a finished "endless" LED tape 5 onto a reel 55 provided in particular for storage and transport, or alternatively is cut to desired lengths. For the sake of completeness it should be noted that the described method is not limited to a manufacturing process as explained here by way of example, but the process sequence can be modified, and for example instead of the hardening and/or drying furnace 4, the entire potting facility 20 is arranged in a hardening and/or drying chamber or for example the finished LED tape is not rolled up, but for example is manufactured in customised arbitrary lengths.

The potting compound 2 can be multi-layered and can comprise a plurality of different kinds of layers.

For example (see FIG. 18), a transparent, that is to say see-through, in particular crystal-clear bottom potting 21 (for example PU transparent) can thus be covered by a translucent, that is to say transmissive or opaque top potting 22 (for example PU diffuse, for example by means of a suitable filler), for example in order to homogenise the emitted light. An embodiment of this kind of the potting compound 2 provides the particular advantage that light spots, in particular produced by LED chips arranged at a distance from one another, can be made "invisible" from the outside, and therefore the LED tape can appear as a continuously homogeneously emitting luminous tape from the outside. For this purpose preferably 60 to 90%, particularly preferably 70 to 90% of the entire potting compound 2, that is to say the bottom potting, can advantageously be applied initially as a clear potting (for example made of clear PU or clear silicone material), and the remaining 10 to 40% or 10 to 30% of the potting compound, that is to say the top potting, can be provided with a light-scattering filler and then applied to the bottom potting in order to make this part of the potting compound translucent. A significant material and therefore cost saving can thus be attained for the filler. At the same time, light absorption in the potting compound 2 can be kept low. The top potting is for example likewise produced on a PU or silicone material basis. For example, powders formed from silicon oxide, zirconium oxide, aluminium oxide, titanium oxide and/or glass are suitable as light-scattering filler.

One or more, in particular partially differently coloured potting layer(s) can also be applied as potting compound 2.

Second Advantageous Development (See FIG. 12):

In a second advantageous development of the method, after insertion and fixing of the flexible conductor tape 32 populated with LED chips 3, that is to say the LED strip 323, in the base profile 1, the base profile 1 is sealed by a cover profile 7 (see FIGS. 8 to 11) which is preferably produced in turn by means of profile extrusion, instead of being sealed by a potting compound 2, as is the case in the first development as described above. The cover profile 7 may be resilient.

Here, the cover profile 7 advantageously may comprise or consist of one or more materials described above in conjunction with the base profile 1, in particular impact-modified PMMA or UV-stabilised PC, and is permeable, at least in regions, for light generated by the LED tape in question.

The base profile 1 and the cover profile 7 can be connected to one another easily and therefore economically, for example by being slid one into the other, for example in accordance with the tongue-and-groove principle (see FIG. 8), by being clicked into one another (see FIGS. 9 to 11), by means of pressing, by means of adhesive bonding and/or by means of welding.

The cover profile 7 may advantageously have an optical functionality, for example designed in such a way that it has a lens effect (see FIG. 10, lens part 9) and/or beam-diverting effect (see FIG. 11, reflector part 10), or is equipped with diffusers for radiation homogenisation.

The flexible conductor tape 32 populated with LED chips 3 can be sealed for example by means of a varnishing process, polymer coating, parylene coating, or the like, for example in order to make it splash-proof A sealing of this kind, however, does not provide sufficient protection against mechanical influences and/or rougher weathering influences. This protection function in this development is performed by the cover profile 7 together with the base profile 1. High IP protection classes can thus be provided in a simple and therefore economically favourable way.

Figure 12:
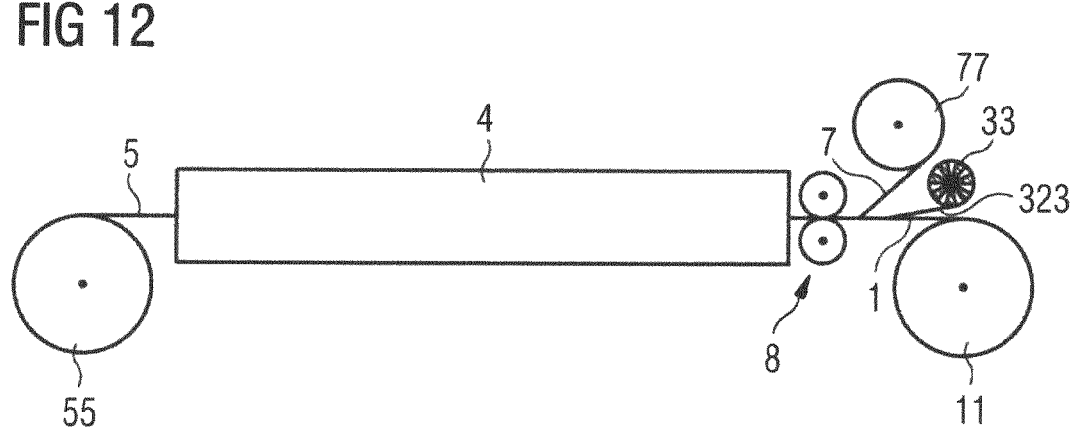
FIG. 12 shows a schematic depiction of an exemplary embodiment of a facility for encapsulation by means of a base profile and a cover profile.
Figure 15:
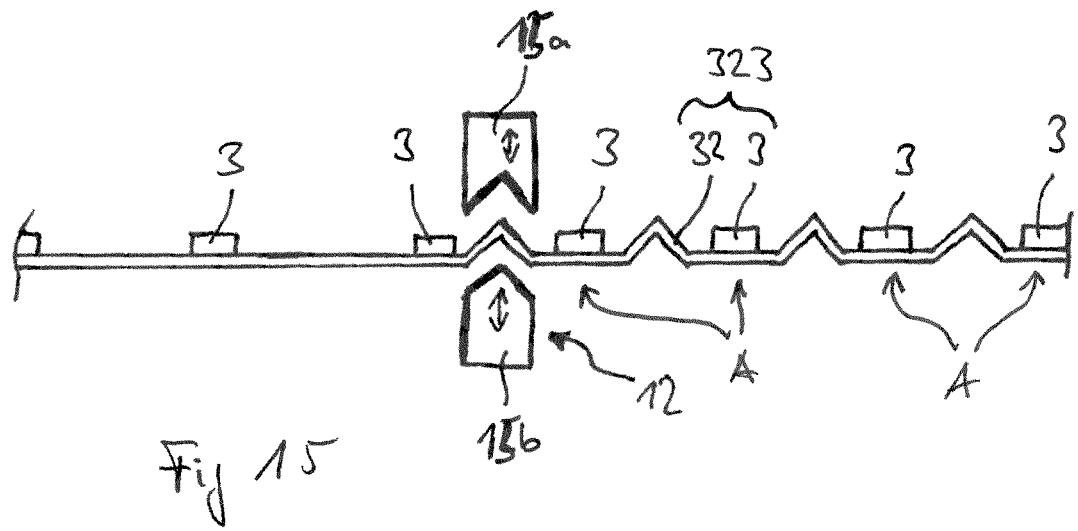
Figure 16:
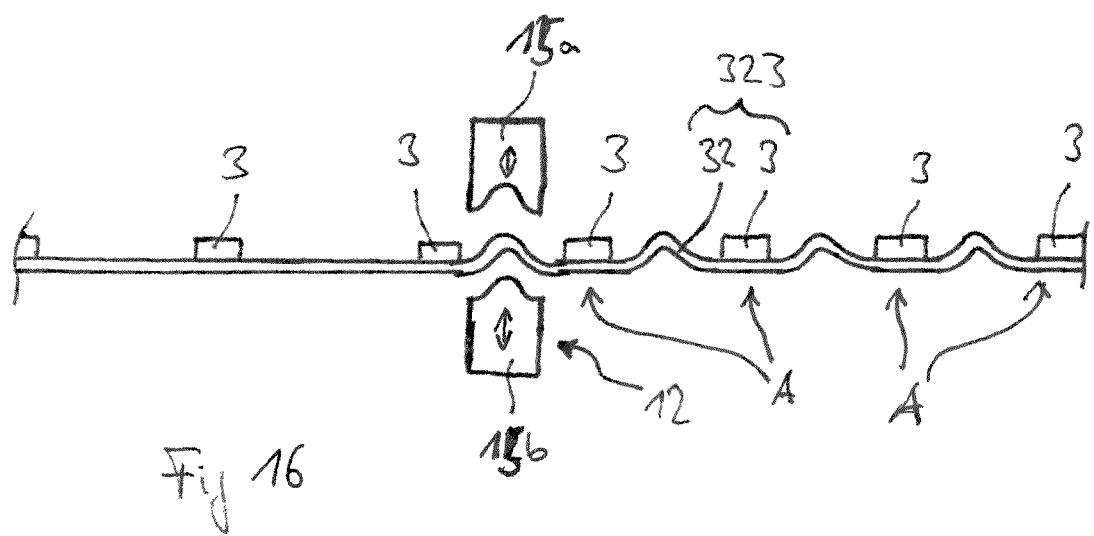
Figure 17:
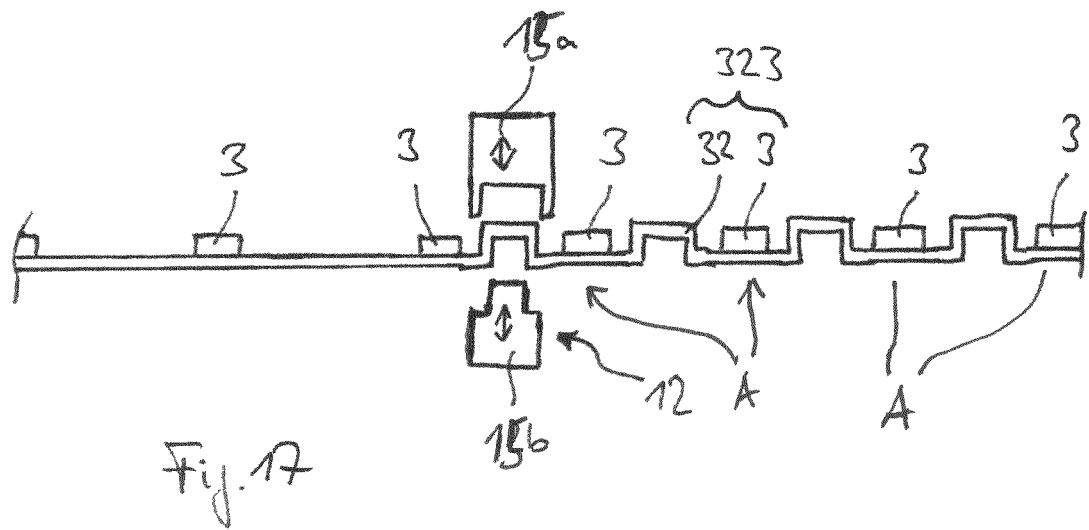

FIG. 12 shows a schematic depiction of an exemplary embodiment of a facility for encapsulation by means of a base profile 1 and a cover profile 7 in accordance with the second development of the method. The base profile 1 and the cover profile 7, similarly to the LED strip 323, are each unrolled from an associated reel 11, 77 and 33 respectively, provided in particular for storage and transport, and are brought together via suitable guide means (not shown) in such a way that the LED strip 323 is introduced into the base profile 1 and then the cover profile 7 is fitted onto the base profile 1. The base profile 1 and the cover profile 7 are pressed against one another and join together in a downstream joining device 8, which for example comprises two rollers arranged one above the other. The joining process can comprise a pressing (for example by means of the tongue-and-groove principle), adhesive bonding, welding, or the like, of the base profile 1 and cover profile 7. The hardening and/or drying furnace 4 provided in this facility and arranged downstream of the joining device 8 can be omitted if, after the connection of the cover profile 7 to the base profile 1, there is no need for a hardening or drying step, for example for a potential connection layer (for example adhesive layer) between the two profiles, or for a potential sealing layer for the flexible conductor tape 32 populated with LED chips 3. After having passed through the hardening and/or drying furnace 4, or, if such a furnace is not necessary for the above-mentioned reasons, after having passed through the joining device 8, the "endless" LED tape 5 manufactured in this way is wound up onto a further reel 55 provided in particular for storage and transport.

Third Advantageous Development:

In a third advantageous development of the method, the first and the second advantageous development are combined with one another. Here, a base profile 1 provided in accordance with the first advantageous development with a potting compound 2 (possible different variants as described above) is additionally provided in accordance with the second advantageous development with a cover profile 7. This is illustrated by way of example in FIG. 8, wherein here the base profile 1 is not completely filled with the potting compound 2. Complete filling of the base profile 1 with potting compound 2 is, however, also conceivable. The potting compound 2 can be multi-layered, as described above in the explanation of the first advantageous development detailing various examples.

A combination of this kind of base profile 1, potting compound 2 and cover profile 7 can provide particular advantages, particularly in regions exposed to a high UV and/or surface loading, in particular by wind and sand. The cover profile 7, manufactured for example from PMMA, in this case protects the PU potting against harmful ambient and weathering influences and thus increases the service life of a corresponding LED tape considerably. The cover profile 7 can be designed such that, following abrasion by ambient and weathering influences, it can be easily replaced for a new one. Consequently, the entire LED tape does not need to be changed, but instead only the cover profile 7, which is associated with a significant cost saving.

The order of the above-explained developments is not intended to be reflective of any grading of the relative significance of the developments. It has been selected purely randomly.

The following descriptions, unless expressly stated otherwise, relate to all three of the above-explained advantageous developments:

Due to the versatility of profile extrusion, versatile base profile and cover profile geometries can be generated cost effectively (see FIGS. 3*a* to 3*h*, which schematically show perspective views (see FIGS. 3*a* to 3*c* and 3*h*) and cross-sectional views (see FIGS. 3*d* to 3*g*) of different variants of base profiles 1. The following figures belong together in pairs: 3*a*/3*d*; 3*b*/3*e*; 3*c*/3*f* and 3*g*/3*h*).

The extruded base profiles 1 and/or cover profiles 7 can be easily equipped with additional features, such as mounting tabs (see FIGS. 3*g* and 3*h*) or other mounting elements, specifically in what is known as an in-line method without significant additional process steps.

Figure 3A:
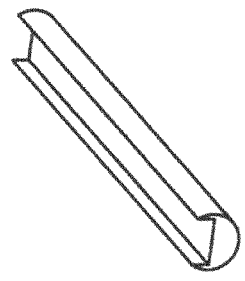
FIGS. 3a to 3h show perspective views (see FIGS. 3a to 3c and 3h) or cross-sections (see FIGS. 3d to 3g) of different variants of base profiles 1 in a schematic depiction.
Figure 3B:
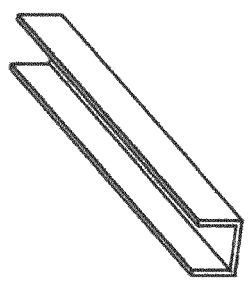
Figure 3C:
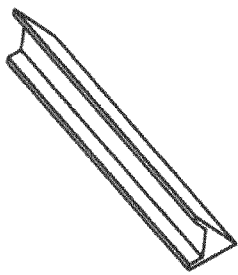
Figure 3D:
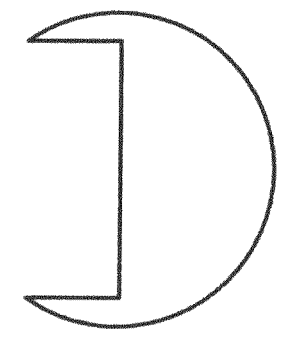
Figure 3E:
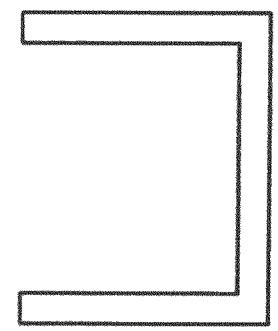
Figure 3F:
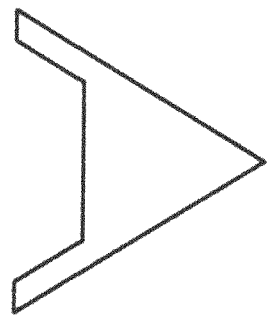
Figure 3G:
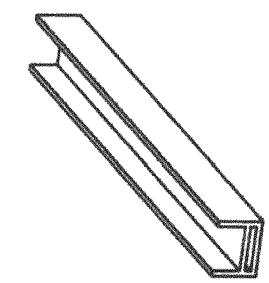
Figure 3H:
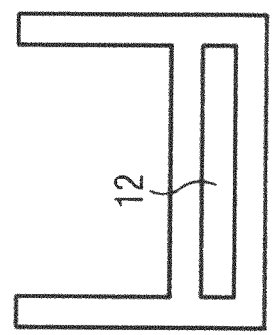

For example, a metal bar or another reinforcing element can be arranged in the tab 12 of the base profile 1 depicted in FIGS. 3*g* and 3*h*, for example for reinforcement/stiffening thereof. An integrated metal bar can also contribute to an improved heat dissipation. The integration of an energy supply or electronics/control function is also conceivable.

Figure 4:
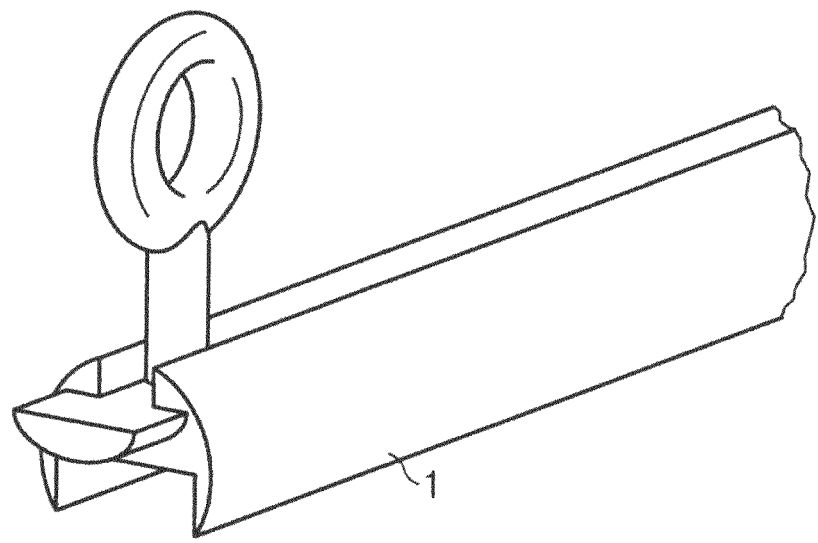
FIG. 4 shows a schematic depiction of a perspective view of a base profile with T-nut technology.

The integration of T-nut technology in the extruded base profile is also conceivable (see FIG. 4, which shows a schematic depiction of a perspective view of a base profile embodied in this way). Mounting aids can thus be generated in an in-line method, which, among other things, can enable the production of complete luminaires from the reel.

Figure 5:
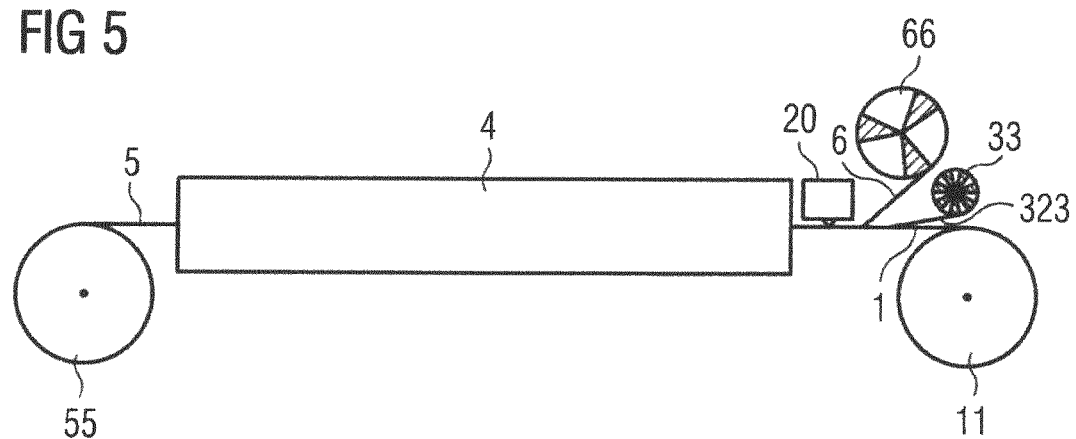
FIG. 5 shows a schematic depiction of a variant of an encapsulation facility for carrying out the method.

A further advantageous additional option made possible by the presented method lies in the fact that an integration of additional elements for example by means of in-line lamination of a functional film 6 is possible in a technically simple way, preferably likewise via a reel 66 (see FIG. 5, which shows a schematic depiction of a variant of an encapsulation facility). For example, a polymethyl methacrylate (PMMA) film, polycarbonate film, or a polypropylene film (or other suitable transparent films) which prevents a colour location shift by direct contact with PU can be used. The insertion of other kinds of functional layers in the in-line method is also possible.

In the method shown in FIG. 5, supplementarily to the method described above in conjunction with FIG. 2, a functional film 6 is unrolled from a further reel 66 provided in particular for storage and transport and is guided via suitable guide means (not shown) onto the LED chips 3 of the LED strip 323. After having passed through the hardening and/or curing furnace 4, the "endless" LED tape 5 thus manufactured is wound onto a further reel 55 provided in particular for storage and transport.

A functional film 6 can also be inserted accordingly in a method as described above in conjunction with FIG. 12.

Figure 2:
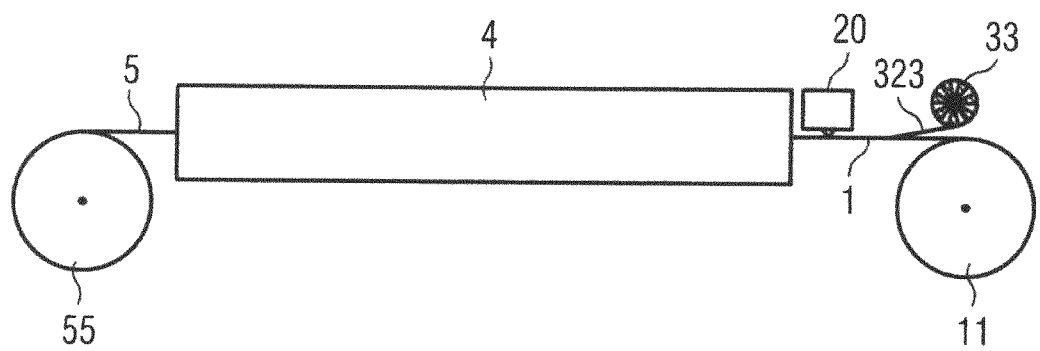
FIG. 2 shows a schematic depiction of an encapsulation facility for producing an LED tape.

In the encapsulation facilities described in conjunction with FIGS. 2, 5 and 12, the hardening and/or drying furnace 4 arranged downstream of the potting facility 20 or the joining device 8 may alternatively be omitted as applicable, and the facility, comprising the reels 11, 33 and 55 and as applicable 66 and/or 77, as applicable the potting facility 20, as applicable the joining device 8 and the guide means (not shown) can be arranged as a whole in a hardening or drying chamber.

Figure 6:
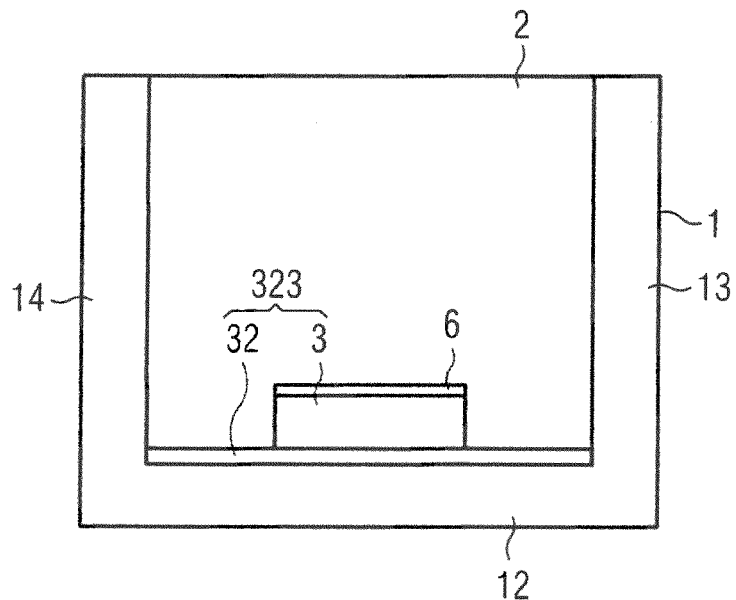
FIGS. 6 and 7 show schematic depictions of sectional views of two embodiments of an LED tape with functional film laminated therein.
Figure 7:
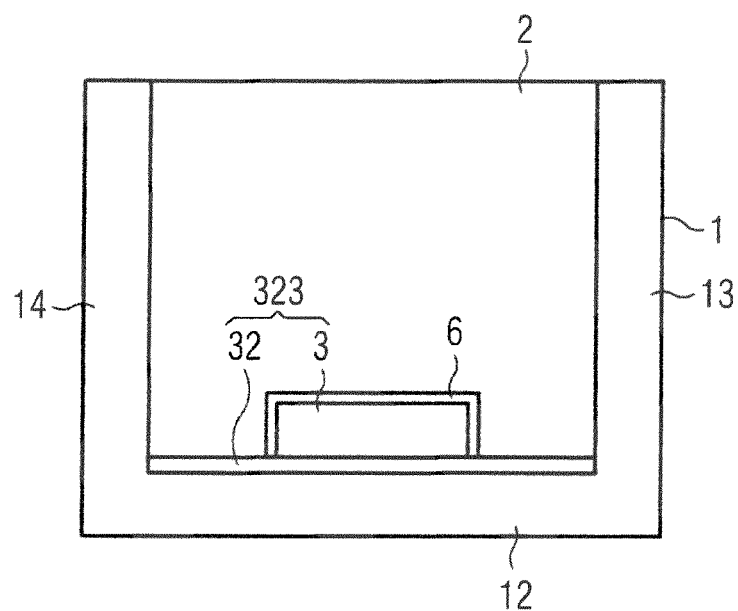

A film laminated onto the LED chips, for example a PMMA film (for example in order to prevent a colour location shift) can be laminated on above the LED chips advantageously in an exact manner, or if desirable with a slight overhang, such that the flanks of the LED chips are covered partially or completely by the functional film (see FIGS. 6 and 7, which show schematic sectional views of finished LED tapes with laminated functional film 6). A (separation) film of this kind is printed onto the LED chips during the potting of the base profile. The (separation) film can be coloured. It can be embodied alternatively or additionally for the homogenisation of the light emitted by the LED chips, or as a lens. A film of this kind may alternatively or additionally have light-scattering and/or light-refracting properties. A film of this kind can also provide "glare protection", which for example is achieved by an integrated light-refracting structure or graining. Properties of this kind generate significant advantages for the lighting of transport means, such as heavy goods vehicles, trailers, caravans, etc.

A further advantageous additional option made possible by the presented method in accordance with the first development consists in the fact that the scratch resistance of the product can be significantly improved by means of a scratch-proof film, or film provided with a scratch-proof coating, laminated as the uppermost layer onto the potting compound 2. A film of this kind can be applied, in particular laminated, onto the composite formed of base profile 1, LED strip, as applicable functional film 6, potting compound 2, and as applicable further component parts of the LED tape of the potting compound 2 in the in-line method before or after the hardening. Applications which require a high scratch resistance can thus be enabled. Here, luminous tapes integrated in floor surfaces are an example. A film of this kind can alternatively or additionally have light-scattering and/or light-refracting properties. A film of this kind can also provide "glare protection", which for example is achieved by an integrated light-refracting structure or graining. Properties of this kind generate significant advantages for the lighting of transport means, such as heavy goods vehicles, trailers, caravans, etc.

Alternatively to the scratch-proof film or film provided with a scratch-proof coating, a scratch-proof varnish, for example a polyurethane (PU) varnish, can be used, or a heavily cross-linked and thus scratch-resistant PU layer can be applied in the in-line method. An uppermost layer applied in the in-line method, whether scratch-proof or not, can be designed to homogenise the light emitted by the LED chips or can be embodied as a lens. A layer of this kind can be transparent, translucent, homogenising or coloured. An uppermost layer of this kind may also provide optical or qualitative advantages, if for example any air inclusions (for example on account of bubble formation) in the potting compound 2 are to be covered by said layer.

The method presented herein is suitable for producing LED tapes which have a resilient base profile 1, which is produced by means of extrusion, in which there is arranged a flexible printed circuit board (flexible PCB) 32, preferably manufactured from polyimide and having chip-on-board (COB)-mounted LED chips 3, and which, for protection of the LED chips 3, inclusive of flexible PCB 32, against mechanical and weathering-induced influences, is sealed by a flexible potting compound 2, particularly preferably by a PU material (for example silicone material is also preferred), for example as described above (see FIGS. 1, 6 and 7) or is sealed by a flexible cover profile 7 produced by means of extrusion, for example as described above (see FIGS. 9 to 11) or is both sealed by a flexible potting compound 2, particularly preferably by a PU material (for example silicone material is also preferred), for example as described above, and is sealed by a flexible cover profile 7 produced by means of extrusion, for example as described above (see FIG. 8).

The base profile 1 is preferably manufactured from a material and with a wall thickness as already described further above in conjunction with the description of the method for production thereof (see above the second, third and fourth paragraphs after the brief description of the drawings). A double-sided adhesive tape or another kind of adhesive layer (not shown in the figures) can be arranged between the base profile 1 and the flexible printed circuit board 32. A functional film 6, for example a separation film for preventing a colour location shift, can be arranged between the LED chips 3 and the potting compound 2. The functional film 6 may alternatively or additionally have light-homogenising, light-scattering and/or light-focusing properties. The base profile 1 can be equipped with metallic elements, such as metal bars, or with fillers, which improve the heat dissipation of LED chips 3. Furthermore, the base profiles 1 can comprise mounting elements, which simplify the mounting of the encapsulated LED tapes.

The base profiles can be designed with different properties in various cross-sectional areas, for example by means of co-extrusion. For example, the rear-side wall 12 of the base profile 1 and therefore the rear side of the LED tape 5 can be impermeable to light, and the side walls 13, 14 of the base profile 1 can be permeable to light, in order to allow a lateral emission of light of the LED tape 5.

The extruded profiles used as base profile can have heat-dissipating properties by being equipped with one or more suitable additives, and thus can contribute during operation of the LED tapes to an improved heat dissipation from the LED chips and can extend the service life thereof and/or increase the performance of the LED tapes. For example, it may be that only the rear-side wall 12 of the base profile 1 or merely the contact face of the base profile 1, that is to say of the LED tape 5, is provided with effective heat-conducting additives, for example metallic or ceramic additives (see FIG. 18), for example by means of co-extrusion. By means of an embodiment of this kind, much higher luminous fluxes/lumens can be attained, and the service life of the LED chips can also be increased due to the resultant improved heat management. A material for a rear-side wall 12 of the base profile 1 designed in this way is for example ALCOM TCE PC 5020 15011 from the company Albis Plastic GmbH.

The inner sides of a base profile can be equipped or formed so as to be at least partially reflective, for example reflective films (for example metallised PET films) can be laminated on economically in the extrusion process.

The cover profile 7 is optionally manufactured preferably from impact-modified PMMA or UV-stabilised PC.

In an embodiment of an above-described LED tape the flexible conductor tape 32 is designed in such a way that it is corrugated at least along the longitudinal direction L of the LED strip 323—and therefore also at least along the longitudinal direction of the LED tape 5 and also of the base profile 1—in relation to a mounting face M of the LED strip 323. In other words, the flexible conductor tape 32 is designed in such a way that the LED strip 323, in its course at least along the longitudinal direction L, has a corrugation relative to a mounting face M for the LED strip 323.

This design of the flexible conductor tape 32, among other things, provides the significant advantage that an LED tape 5 has a considerably increased bending property, in particular parallel to the mounting face M, because the conductor tape 32, on account of the corrugation, can compress on the inner side of the bend and can extend on the outer side of the bend.

In addition, as a result of this design of the flexible conductor tape 32, among other things the significant advantage is provided that mechanical stress within an LED tape 5 caused by different thermal expansions or shrinkages of the components in the LED tape 5 (base profile 1, sealing compound 2, LED strip 323, etc.), which may lead to damage by tearing of the flexible conductor tape 32, can be significantly reduced. This is all the more significant, the longer the manufactured LED tapes are. Temperature differences for example in the case of outdoor applications and the associated stresses caused by expansion or shrinkage constitute a significant challenge in long encapsulated LED tapes. Previously, this problem in long ("endlessly manufactured") LED tapes was a practically still unsolved problem. Known encapsulation systems permit only very limited lengths of LED tapes, because with increasing length of the LED tape mechanical stresses within the LED tape caused by different thermal expansions or shrinkages increase.

A further advantage resulting from this design of the flexible conductor tape 32 lies, among other things, in the fact that the distance between the LED chips 3 in an LED tape 5 can be easily reduced. Light solutions that are more homogeneous can thus be achieved.

The term "corrugated" in the present context shall be understood to mean any form of the flexible conductor tape 32 (for example curved in an undulating manner, bent in a zigzag like manner, or a combination of bends and curves) as a result of which the flexible conductor tape 32, when mounted in the base profile 1 or on another kind of flat carrier, does not rest continuously along its longitudinal direction L on the base or mounting face M thereof or on a connection layer applied thereto (for example a double-sided adhesive tape), but instead runs over it in an undulating form in the predefined manner, that is to say between each two contact zones A of the flexible conductor tape 32 on the base profile 1, or on the connection layer, has an arcuate or sharply pointed curvature away from the base profile 1 or carrier. In other words, the flexible conductor tape 32 is shaped in such a way that its course along its longitudinal direction L in relation to a mounting face M for the LED strip 323, for example the base face of the base profile 1, alternates between local high points and local low points.

The flexible conductor tape 32 is shaped here in one embodiment in such a way that the LED chips 3 are each arranged above a contact zone A or adjacently to a contact zone A, which can improve a heat dissipation from the LED chips 3.

A corrugated form can be produced for example by bending or folding the flexible conductor tape 32 perpendicularly to the primary plane of extent thereof and transversely to the longitudinal direction thereof L at predefined distances, for example between each two LED chips 3. An exemplary embodiment of an LED strip 323 of this kind with corrugated flexible conductor tape 32 is shown in FIG. 13.

A corresponding bending or folding process for an LED strip 323, which preferably is carried out after the application of the LED chips 3 or also before, can be performed before the above-described method or can be integrated therein. In the case of an integrated bending or folding process an associated bending or folding apparatus is arranged in the devices according to FIGS. 2, 5 and 12 between the reel 33 with the LED strip 323 and the region in which the LED strip 323 is introduced into the base profile 1.

The flexible conductor tape 32, on account of this shaping, can be bent in all dimensions and therefore can enable an improved bending property of the LED tape 5 in all dimensions.

With a typical width of the LED strip 32 of 8 mm or 10 mm, the peak-to-valley value ST of the corrugated flexible conductor tape 32 in a base profile 1 is preferably between 1 mm and 6 mm, preferably between 2 and 6 mm. In other words, between two connection points between the base profile 1 and flexible conductor tape 32, the maximum distance of the flexible conductor tape 32 from the base profile 1 or as applicable from the connection layer is preferably at least 1 mm and at most 6 mm, preferably between 2 and 6 mm.

Suitable methods for carrying out a bending or folding process of this kind or for producing correspondingly corrugated LED strips 323 are shown schematically in FIGS. 14 to 17. Here, predetermined curvatures are bent into the flexible conductor tape 32 of an LED strip 323, for example between each two adjacent LED chips 3, by means of a pressing device 12 comprising two stamping parts 12a and 12b, which then leads on the whole to a corrugated form of the LED strip 323, described above in principle, and to the associated advantages for the above-described LED tapes 5. The curvatures can also be arranged only every two, three, four or more LED chips 3, or also at irregular intervals. As necessary, a plurality of curvatures of this kind can also be arranged between two LED chips 3.

The embodiment of an LED strip 323 with corrugated flexible conductor tape 32 constitutes a separate invention, independently of the other features of the methods and LED tapes described here. LED strips 323 of this kind can also be used advantageously in other kinds of assemblies.

In particular in conjunction with a corrugated flexible conductor tape 32 as described above, in one embodiment of an LED strip 323 the sides of the LED chips 3, at which the electrical connections thereof are guided out therefrom and soldered, are arranged facing the longitudinal sides of the flexible conductor tape 32. Strip-shaped solder pads 324 of the flexible conductor tape 32 provided for the LED chips 3 run along the longitudinal sides of the conductor tape. In the case of a plurality of electrical connections arranged on a side of an LED chip 3, as is the case for example in a multi-LED with a PLCC6 housing, the associated solder pads 325 of the flexible conductor tape 32 therefore lie in each case in a row along the longitudinal sides of the conductor tape. This arrangement of the solder pads 324 or 325 is shown schematically in FIG. 19.

An arrangement of this kind of the solder points of the LED chips 3 on the longitudinal side increases the resistance of the LED strip 323 under torsional load. Under torsion, a conventionally "transversely soldered" LED chip, in which, respectively, an elongate solder pad or a plurality of solder pads arranged on a side of an LED chip runs or are arranged side by side transversely to the longitudinal direction of the conductor tape, detaches much more easily than an LED chip soldered in the longitudinal direction as described above.

Particularly preferred fields of application for the above-explained LED tapes are the automotive sector, here in particular the utility vehicle or heavy goods vehicle sector, and the architectural sector.

In the automotive sector the LED tapes are very particularly suitable for trailer or container interiors, and also for external lighting. Luminaires or luminous tapes formed from, or with the above-explained LED tapes can be integrated in a trailer or container in the required IP protection class with significantly less effort. Instead of conventional spot lighting, an above-described LED tape or a luminaire comprising an LED tape of this kind can be installed for example in the upper edges of the trailer, by mounting aids integrated for example in the base profile and having an individually selected geometry. A subsequent mounting (retrofitting) is also possible in a technically simple way. LED tapes according to the above-described solution or luminaires comprising LED tapes of this kind (luminous tapes) can also be integrated externally and/or internally on trailers or containers and also used in boat and ship building in the required IP protection class with relatively low technical effort.

LED tapes according to the above-described solution can be used advantageously in the sector of external and internal building lighting. Mounting aids integrated in particular in the base profile can significantly simplify the mounting on buildings.

Significant advantages can be generated in all areas of the gaming industry, such as slot machines, arcade cabinets, betting terminals, etc., with the LED tapes described herein, for example:
  design freedom (curves, endless design) in particular by the substitution of the currently conventional rigid PCBs with "corrugated" flexible conductor tapes
  simple mounting due to integrated fastening systems
  geometry freedom, which can be provided easily by the profile extrusion
  cost reduction.

The methods and the corresponding LED tape described herein of course are not limited to the exemplary embodiments or combinations of features explained therein. Rather, the described features can be combined in different advantageous embodiments and developments proceeding from the core of the invention.

LIST OF REFERENCE SIGNS 1 base profile
2 potting compound
3 LED chip
4 hardening and/or drying furnace
5 LED tape
6 functional film
7 cover profile
8 joining device
9 lens part
10 reflector part
11 reel
12 rear-side wall
13, 14 side wall
15 pressing device
15a, 15b stamping part
21 bottom seal
22 top seal
23 nozzle
32 flexible conductor tape
33 reel 55 reel
66 reel
77 reel
323 LED strip
324, 325 solder pad
A contact zone
L longitudinal direction
M mounting face
ST peak-to-valley value

The invention claimed is:

1. A light-emitting diode tape comprising:
a resilient, rollable, base profile comprising a rear-side wall and two side walls, the rear-side wall being impermeable to light and the side walls being permeable to light to allow a lateral transmission of light from the light-emitting diode tape;
a flexible light-emitting diode strip, comprising a flexible conductor tape on which a plurality of light-emitting diode chips are arranged and electrically connected to one another, near the rear-side wall and between the two side walls; and
a translucent top potting layer, contained between the two sidewalls above the flexible light-emitting diode strip, to homogenize light emitted from the diode chips;
wherein the flexible conductor tape along a longitudinal direction thereof is formed alternately corrugated between local high points and local low points in relation to a mounting face of the base profile for the light-emitting diode strip; and
wherein corrugations in the flexible conductor tape are bends, in the flexible conductor tape at predetermined intervals, comprising a sharply pointed fold between each two LED chips or groups of LED chips, perpendicularly to a main plane of extent thereof and transversely to the longitudinal direction thereof.

2. A light-emitting diode tape according to claim 1, wherein the flexible light-emitting diode strip, along its longitudinal direction, does not rest continuously on the mounting face provided therefor or on a connection layer applied thereto, and runs over it corrugatedly such that the flexible light-emitting diode strip has a predefined curvature away from the mounting face or the connection layer, and is distanced therefrom at a location between each two contact zones of the flexible conductor tape on the mounting face or the connection layer.

3. The light-emitting diode tape according to claim 2, wherein the light-emitting diode (LED) chips are each arranged above at least one of the contact zones or adjacently to at least one of the contact zones.

4. The light-emitting diode tape according claim 3, further comprising strip-shaped solder pads for the LED chips or groups of a plurality of solder pads for the LED chips, and the solder pads are arranged in a row along a longitudinal direction of the light-emitting diode strip.

5. The light-emitting diode tape according to claim 4, further comprising a clear bottom potting between the flexible light-emitting diode strip and the translucent top potting compound, wherein the translucent top potting compound comprises 10% to 30% of entire potting compound, and the clear bottom potting comprises 70% to 90% of entire potting compound.

6. The light-emitting diode tape according to claim 5 wherein the connection layer comprises double-sided adhesive tape.

7. A method for producing a light-emitting diode tape comprising:
producing a resilient rollable base profile having a rear-side wall and two side walls by means of profile extrusion and, after producing the rollable base profile, rolling up the resilient base profile on a first reel;
producing a flexible LED strip comprising a corrugated flexible conductor tape with sharply pointed folds at predefined intervals between each two LED chips or groups of LED chips thereon, and rolling up the LED strip on a second reel;
unrolling the base profile from the first reel;
unrolling the LED strip from the second reel, and introducing the LED strip into the base profile near the rear-side wall and between the two sidewalls; and
covering the LED strip in the base profile with a translucent top potting compound contained between the two sidewalls to homogenize light emitted from the diode chips.

8. The method according to claim 7, wherein a Shore hardness of a material of the base profile, and of a material of the translucent top potting compound, are adapted to one another.

9. The method according to claim 8, wherein the Shore hardnesses lie between 20 and 40 Shore D at a temperature of 23° C.

10. The method according to claim 9, wherein the resilient base profile is produced from a material selected from the group consisting of PVC material, soft PVC material, resilient thermoplastic material, or a resilient thermoset material.

11. The method according to claim 10, further comprising improving the adhesion of the potting compound to the base profile, by modifying a surface tension of the material of the base profile using a method selected from the group consisting of a corona method, a plasma method, a chemical method or a mechanical method.

12. The method according to claim 11, further comprising providing at least a portion of the translucent top potting compound of at least one polyurethane material.

13. The method according to claim 12, further comprising:
treating the base profile provided with the LED strip, and the translucent top potting compound, in a hardening or drying furnace; and
cutting the light-emitting diode tape to predefined lengths, or rolling the light-emitting tape onto a third reel.

14. The method according to claim 8, wherein the Shore hardnesses lie between 20 and 25 Shore D at a temperature of 23° C.

15. The method according to claim 7, further comprising the step of providing a clear bottom potting between the flexible light-emitting diode strip and the translucent top potting compound, wherein the translucent top potting compound comprises 10% to 30% of entire potting compound, and the clear bottom potting comprises 70% to 90% of entire potting compound.

16. A light-emitting diode tape comprising:
a flexible light-emitting diode strip comprising a corrugated flexible conductor tape on which a plurality of light-emitting diode chips are arranged and electrically connected to one another, the corrugated flexible conductor tape having sharply pointed folds at predefined intervals between each two LED chips or groups of LED chips, wherein the light-emitting diode strip is received in a rollable resilient extruded base profile having a rear-side wall and two side walls, and the flexible conductor tape comprising flexible PCB populated with light-emitting diode (LED) chips; and a translucent top potting compound contained between the two side walls and above the flexible light-emitting diode strip, to homogenize light emitted from the diode chips.

17. The light-emitting diode tape according to claim 16, wherein the Shore hardness of the material of the base profile, and of the material of the translucent top potting compound, are adapted to one another.

18. The light-emitting diode tape according to claim 17, wherein the Shore hardnesses lie between 20 and 40 Shore D at a temperature of 23° C.

19. The light-emitting diode tape according to claim 17, wherein the Shore hardnesses lie between 20 and 25 Shore D at a temperature of 23° C.

20. The light-emitting diode tape according to claim 16, wherein the resilient base profile comprises aliphatic or aromatic polyurethane.

21. The light-emitting diode tape according to claim 16, wherein the resilient base profile comprises a member selected from the group consisting of PVC material, soft PVC material, resilient thermoplastic material, or a resilient thermoset material.

22. The light-emitting diode tape according to claim 21, wherein the translucent top potting compound comprises at least one polyurethane material.

23. The light-emitting diode tape according to claim 22, wherein the LED strip is sealed separately.

24. The light-emitting diode tape according to claim 23 wound up onto a reel.

25. The light-emitting diode tape according to claim 24, wherein the resilient base profile is co-extruded and only a rear-side wall of the base profile is provided with at least one effective heat-conducting additive.

26. The light-emitting diode tape according to claim 25, further comprising a clear bottom potting between the flexible light-emitting diode strip and the translucent top potting compound, wherein the translucent top potting compound comprises 10% to 30% of entire potting compound, and the clear bottom potting comprises 70% to 90% of entire potting compound.

* * * * *